United States Patent
Monajemi et al.

(10) Patent No.: US 10,053,099 B2
(45) Date of Patent: Aug. 21, 2018

(54) MULTI-SPEED TRANSMISSION AND METHOD OF CONTROL

(71) Applicant: GM Global Technology Operations LLC, Detroit, MI (US)

(72) Inventors: Dara Monajemi, Lansing, MI (US); Matthew D. Whitton, Howell, MI (US); Brian M. Porto, Waterford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 241 days.

(21) Appl. No.: 15/169,268

(22) Filed: May 31, 2016

(65) Prior Publication Data
US 2017/0341651 A1 Nov. 30, 2017

(51) Int. Cl.
*B60W 30/19* (2012.01)
*B60W 30/18* (2012.01)
*B60W 10/02* (2006.01)
*B60W 10/06* (2006.01)
*B60W 10/115* (2012.01)
*F16H 3/66* (2006.01)

(52) U.S. Cl.
CPC ...... *B60W 30/18072* (2013.01); *B60W 10/02* (2013.01); *B60W 10/026* (2013.01); *B60W 10/06* (2013.01); *B60W 10/115* (2013.01); *B60W 30/19* (2013.01); *F16H 3/66* (2013.01); *B60W 2510/0216* (2013.01); *B60W 2510/0638* (2013.01); *B60W 2510/1005* (2013.01); *B60W 2510/182* (2013.01); *B60W 2710/021* (2013.01); *B60W 2710/024* (2013.01); *B60W 2710/0644* (2013.01); *B60W 2710/0666* (2013.01); *B60W 2710/1005* (2013.01); *F16H 2200/006* (2013.01); *F16H 2200/2012* (2013.01); *F16H 2200/2043* (2013.01); *Y02T 10/76* (2013.01)

(58) Field of Classification Search
None
See application file for complete search history.

(56) References Cited

U.S. PATENT DOCUMENTS

| | | | | |
|---|---|---|---|---|
| 2008/0261763 | A1* | 10/2008 | Phillips | F16H 3/66 475/276 |
| 2012/0065019 | A1* | 3/2012 | Hart | F16H 3/663 475/271 |
| 2012/0071289 | A1* | 3/2012 | Wittkopp | F16H 3/66 475/275 |
| 2016/0312858 | A1* | 10/2016 | Foster | F16H 3/666 |
| 2017/0074369 | A1* | 3/2017 | Park | F16H 3/66 |
| 2017/0114867 | A1* | 4/2017 | Kim | F16H 3/666 |
| 2017/0159755 | A1* | 6/2017 | Park | F16H 3/66 |

* cited by examiner

Primary Examiner — Justin Holmes (57) ABSTRACT

A transmission is provided having a control module, an input member, an output member, four planetary gear sets, a plurality of interconnecting members, and a plurality of torque transmitting devices. Each of the planetary gear sets includes first, second and third members. The torque transmitting devices include clutches and brakes. The control module includes a control logic sequence for performing a coasting downshift of the transmission.

14 Claims, 4 Drawing Sheets

| Gear State | Gear Ratio | TTM | | | | |
|---|---|---|---|---|---|---|
| | | 126 | 124 | 130 | 128 | 132 |
| Rev | -3.653 | X | X | | | X |
| N | | 0 | 0 | | | |
| 1st | 4.600 | X | X | | X | |
| 2nd | 3.067 | X | X | X | | |
| 3rd | 2.013 | | X | X | X | |
| 4th | 1.600 | | X | X | | X |
| 5th | 1.244 | | X | X | | X |
| 6th | 1.000 | | | X | X | X |
| 7th | 0.848 | X | | | X | X |
| 8th | 0.667 | X | | X | | X |

0 = Engaged Not Carrying Torque
x = Engaged Carrying Torque

MULTI-SPEED TRANSMISSION AND METHOD OF CONTROL

FIELD

The invention relates generally to a multiple speed transmission having a plurality of planetary gear sets and a plurality of torque transmitting devices and more particularly to a transmission having a control module for executing a control logic sequence for operating the transmission.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. Within the arrangement of the transmission, for example, three friction clutches may require activation for achieving any gear ratio. Two common clutches are required to be activated for sequential gear ratios. Thus, one clutch is being deactivated while another is being activated in order to change from, for example, 4th gear ratio to 5th gear ratio.

As one common problem aspect of automatic transmissions, control of the coasting downshift is not optimal. Inconsistent gear shift quality, engine flare or race, and control of step-in maneuvers are areas that require improvement from a transmission controls perspective. Thus, while current transmissions achieve their intended purpose, the need for new and improved transmission controls which ensure operators expectations are achieved is essentially constant. Accordingly, there is a need for an improved and reliable multiple speed transmission control system and method.

SUMMARY

A transmission is provided having an input member, an output member, a plurality of planetary gear sets, a plurality of interconnecting members, a plurality of torque transmitting mechanisms, and a transmission control module.

In one example of the present invention, the control module includes a control logic sequence having a plurality of control logics.

In another example of the present invention, the control logic sequence includes a first control logic for detecting a sub-idle coast downshift from a higher gear ratio to a lower, sequential gear ratio.

In yet another example of the present invention, the control logic sequence includes a second control logic for detecting if the sub-idle coast downshift is complete if the first control logic detects that the sub-idle coast downshift is occurring.

In yet another example of the present invention, the control logic sequence includes a third control logic for detecting if there has been a driver step-in if the second control logic detected that the downshift has not completed.

In yet another example of the present invention, the control logic sequence includes a fourth control logic for detecting if a turbine of a torque convertor connected to the input member of the transmission is in sync with a rotational speed of an engine drivingly connected to a pump of the torque.

In yet another example of the present invention, the control logic sequence includes a fifth control logic for calculating a transmission load and sending a speed increase request to the engine based on the transmission load to increase engine speed if the turbine is not in sync with the engine speed.

In yet another example of the present invention, the control logic sequence includes a sixth control logic for maintaining engine speed if the turbine is in sync with the engine speed.

In yet another example of the present invention, the control logic sequence includes a seventh control logic for ramping out the offgoing torque transmitting mechanism after the driver step-in has been detected in the third control logic and for ramping up the oncoming torque transmitting mechanism.

In yet another example of the present invention, the control logic sequence includes an eighth control logic for calculating an offgoing brake pressure and an oncoming clutch ramp rate if the driver step-in is not detected in the third control logic.

In yet another example of the present invention, the control logic sequence includes a ninth control logic for ramping up a torque of the engine if the torque of the engine at the completion of the downshift is less than a steady state.

In yet another example of the present invention, after the execution of the fifth, seventh, and eighth control logics the control module returns to execute the second control logic.

In yet another example of the present invention, the controller executes the ninth control logic again if the controller detects that the torque of the engine at the end of the downshift is less than a steady state torque.

In yet another example of the present invention, the calculation for transmission load in the fifth control logic is $$\tau_{Trans\_Load\_Target} = \frac{(\tau_{Clutch\_Target} / TorqueRatio)}{Lever\_Ratio} + Ofst.$$

In yet another example of the present invention, the oncoming clutch target pressure of the seventh control logic is calculated as $$P_{oncoming\ clutch\ target} = G_{Xoncoming\ clutch} * (\tau_{oncoming\ clutch\ target}) + P_{RS}.$$

In yet another example of the present invention, a first and a second of the plurality of torque transmitting mechanisms are each selectively engageable to connect a member of a first of the plurality of planetary gear sets with the stationary member and a second, a third, and a fourth of the plurality of torque transmitting mechanisms are each selectively engageable to connect a member of a second, and a third of the plurality of planetary gear sets with a first member of a fourth of the plurality of planetary gear sets.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
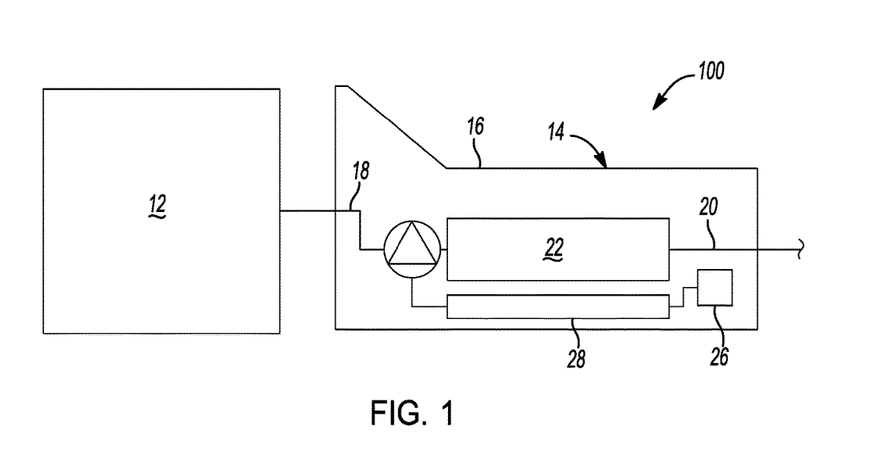
FIG. 1 is a schematic of a powertrain for a vehicle according to the present disclosure.

With reference to FIG. 1, an exemplary powertrain is generally indicated by reference number 10. The powertrain includes an engine 12 connected to a transmission 14. The engine 12 may be a conventional internal combustion engine or an electric engine, or any other type of prime mover, without departing from the scope of the present disclosure. In addition, additional components, such as hydrodynamic fluid driving devices such as torque converters and fluid couplings, may be disposed between the engine 12 and the transmission 14 without departing from the scope of the present disclosure. The engine 12 supplies a driving torque to the transmission 14.

The transmission 14 includes a typically cast, metal housing 16 which structurally encloses and protects the various components of the transmission 14. The housing 16 includes a variety of apertures, passageways, shoulders and flanges which position and support these components. The transmission 14 includes an input shaft 18, an output shaft 20, and a gear and clutch arrangement 22. It should be appreciated that while the transmission 14 is illustrated as a rear wheel drive transmission, the transmission 14 may have other configurations without departing from the scope of the present disclosure. The input shaft 18 is connected with the engine 12 and receives input torque or power from the engine 12. The output shaft 20 is preferably connected with a final drive unit (not shown) which may include, for example, propshafts, differential assemblies, and drive axles. The input shaft 18 is coupled to and provides drive torque to the gear and clutch arrangement 22.

At the outset, it should be appreciated that the embodiments of the gear and clutch arrangement 22 of the transmission 14 of the present invention have an arrangement of permanent mechanical connections between the elements of the four planetary gear sets. A first component or element of a first planetary gear set is permanently coupled to a first component or element of a second planetary gear set. A second component or element of the first planetary gear set is permanently coupled to a third component or element of a fourth planetary gear set. A third component or element of the second planetary gear set is permanently coupled to a third component or element of a third planetary gear set. A second component or element of the third planetary gear set is permanently coupled to a second component or element of the fourth planetary gear set. Furthermore, the embodiments of the present invention include a number of selectable mechanical connections between members of the planetary gear sets, the transmission housing, or other rotating members. For example, a third component or element of the first planetary gear set is connectable to the transmission housing. A first component or element of the first planetary gear set is connectable to the transmission housing. A second component or element of the second planetary gear set is connectable to the first component or element of the fourth planetary gear set. A third component or element of the second planetary gear set and a third component or element of the third planetary gear set is connectable to the first component or element of the fourth planetary gear set. A first component or element of the third planetary gear set is connectable to the fourth component or element of the fourth planetary gear set.

Figure 2:
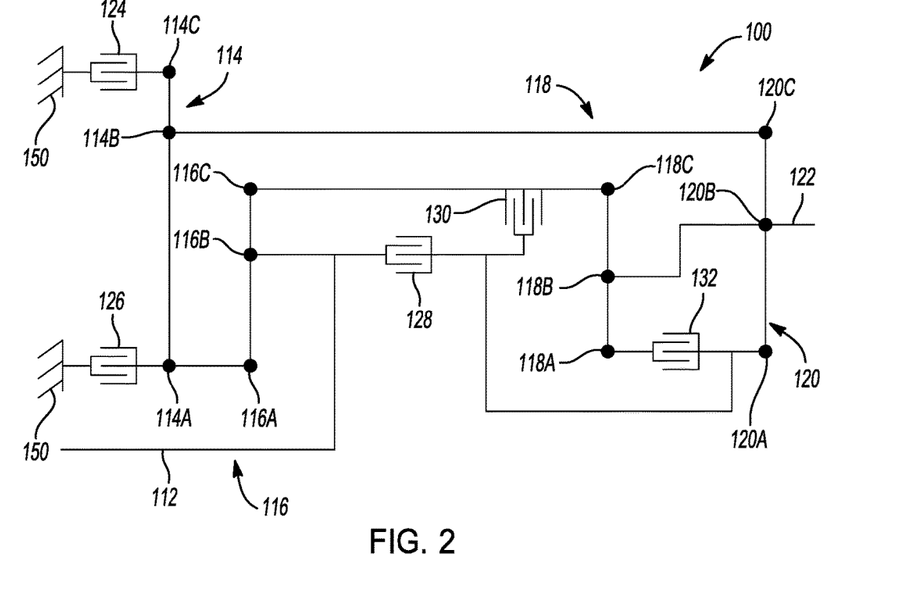
FIG. 2 is a lever analogy diagram of an embodiment of an eight speed transmission according to the present invention.

Referring now to FIG. 2, an embodiment of an eight speed transmission 100 is illustrated in a lever analogy diagram format. A lever analogy diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever analogy diagrams can be found in SAE Paper 810102, "The Lever Analogy: A New Tool in Transmission Analysis" by Benford and Leising which is hereby fully incorporated by reference.

The transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 1186 and a third node 118C, a fourth planetary gear set 120 having three nodes: a first node 120A, a second node 120B and a third node 120C and an output shaft or member 122.

The input member 112 is coupled to the second node 116B of the second planetary gear set 116. The output member 122 is coupled to the second node 120B of the fourth planetary gear set 120. The second node 114B of the first planetary gear set 114 is coupled to the third node 120C of the fourth planetary gear set 120. The first node 114A of the first planetary gear set 114 is coupled to the first node 116A of the second planetary gear set 116. The third node 116C of the second planetary gear set 116 is coupled to the third node 118C of the third planetary gear set 118. The second node 118B of the third planetary gear set 118 is coupled to the second node 120B of the fourth planetary gear set 120.

A first brake 124 selectively connects the third node 114C of the first planetary gear set 114 with a stationary member or transmission housing 150. A second brake 126 selectively connects the first node 114A of the first planetary gear set 114 with the stationary member or transmission housing 150. A first clutch 128 selectively connects the second node 116B of the second planetary gear set 116 to the first node 120A of the fourth planetary gear set 120. A second clutch 130 selectively connects the third node 116C of the second planetary gear set 116 and the third node 118C of the third planetary gear set 118 with the first node 120A of the fourth planetary gear set 120. A third clutch 132 selectively connects the first node 118A of the third planetary gear set 118 to the first node 120A of the fourth planetary gear set.

Figure 3:
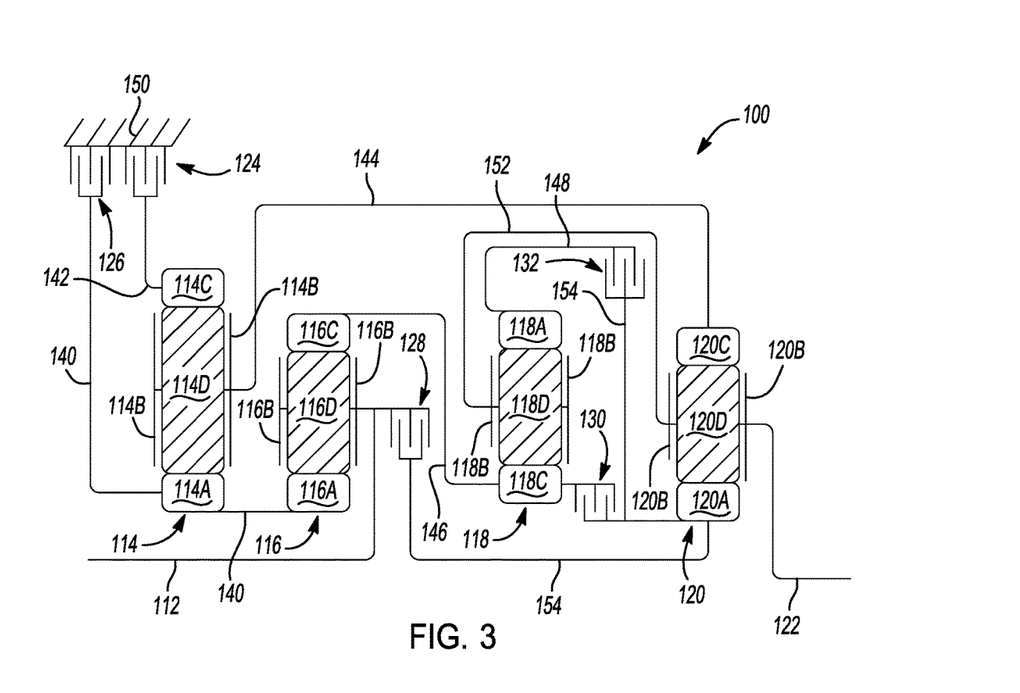
FIG. 3 is a diagrammatic illustration of an embodiment of an eight speed transmission according to the present invention.

Referring now to FIG. 3, a stick diagram presents a schematic layout of the embodiment of the ten speed transmission 100 according to the present invention. In FIG. 3, the numbering from the lever analogy diagram of FIG. 2 is carried over. The clutches and couplings are correspondingly presented whereas the nodes of the planetary gear sets now appear as components of planetary gear sets such as sun gears, ring gears, planet gears and planet gear carriers.

For example, the planetary gear set 114 includes a sun gear member 114A, a ring gear member 114C and a planet gear carrier member 114B that rotatably supports a set of planet gears 114D (only one of which is shown). The sun gear member 114A is connected for common rotation with a first interconnecting shaft or member 140. The ring gear member 114C is connected for common rotation with a second interconnecting shaft or member 142. The planet gear carrier member 114B is connected for common rotation with a third interconnecting shaft or member 144. The set of planet gears 114D are configured to intermesh with both the sun gear member 114A and the ring gear member 114C.

The planetary gear set 116 includes a sun gear member 116A, a ring gear member 116C and a planet gear carrier member 116B that rotatably supports a set of planet gears 116D (only one of which is shown). The sun gear member 116A is connected for common rotation with the first interconnecting shaft or member 140. The ring gear member 116C is connected for common rotation with a fourth interconnecting shaft or member 146. The planet carrier member 116B is connected for common rotation with the input member 112. The planet gears 116D are configured to intermesh with both the sun gear member 116A and the ring gear member 116C.

The planetary gear set 118 includes a sun gear member 118C, a ring gear member 118A and a planet gear carrier member 118B that rotatably supports a set of planet gears 118D (only one of which is shown). The sun gear member 118C is connected for common rotation with the fourth interconnecting shaft or member 146. The ring gear member 118A is connected for common rotation with a fifth interconnecting shaft or member 148. The planet carrier member 118B is connected for common rotation with a sixth interconnecting shaft or member 152. The planet gears 118D are configured to intermesh with both the sun gear member 118C and the ring gear member 118A.

The planetary gear set 120 includes a sun gear member 120A, a ring gear member 120C and a planet gear carrier member 120B that rotatably supports a set of planet gears 120D (only one of which is shown). The sun gear member 120A is connected for common rotation with a seventh interconnecting shaft or member 154. The ring gear member 120C is connected for common rotation with the third interconnecting shaft or member 144. The planet carrier member 120B is connected for common rotation with the output member 122 and the sixth interconnecting shaft or member 152. The planet gears 120D are configured to intermesh with both the sun gear member 120A and the ring gear member 120C.

The input shaft or member 112 is continuously connected to an engine (not shown), a turbine of a torque converter (not shown), or an output of a clutch. The output shaft or member 122 is continuously connected with the final drive unit or transfer case (not shown).

The torque-transmitting mechanisms or brakes 124, 126, and clutches 128, 130, 132 allow for selective interconnection of the shafts or interconnecting members, members of the planetary gear sets and the housing. For example, the first brake 124 is selectively engageable to connect the second interconnecting shaft or member 142 with the stationary member or the transmission housing 150 in order to restrict the second interconnecting shaft or member 142 from rotating relative to the stationary member or transmission housing 150. The second brake 126 is selectively engageable to connect the first interconnecting shaft or member 140 with the stationary member or the transmission housing 150 in order to restrict the first interconnecting shaft or member 140 from rotating relative to the stationary member or transmission housing 150. The first clutch 128 is selectively engageable to connect the input shaft 112 with the seventh interconnecting shaft or member 154. The second clutch 130 is selectively engageable to connect the fourth interconnecting shaft or member 146 with the seventh interconnecting shaft or member 154. The third clutch 132 is selectively engageable to connect the fifth interconnecting shaft or member 148 with the seventh interconnecting shaft or member 154.

Figure 4:
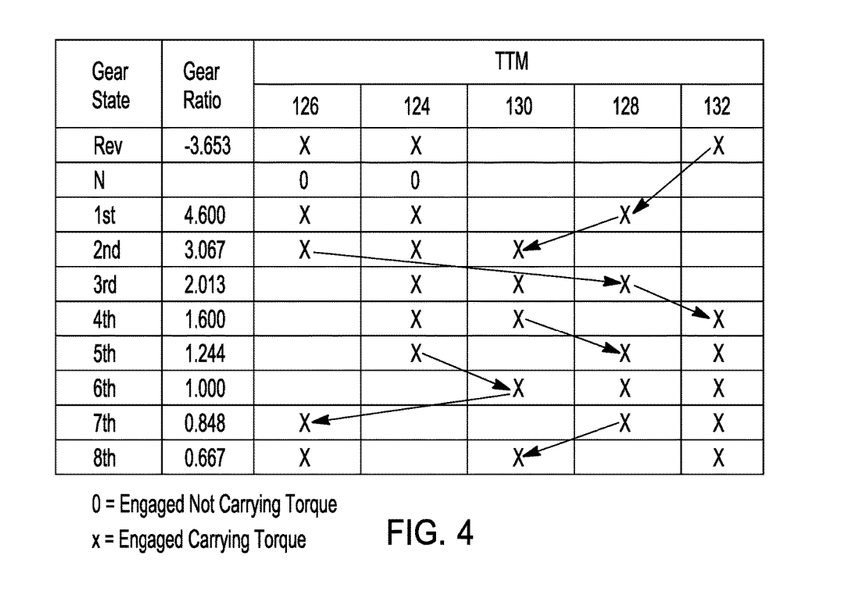
FIG. 4 is a truth table presenting the state of engagement of the various torque transmitting elements in each of the available forward and reverse speeds or gear ratios of the transmission illustrated in FIGS. 1 and 2 according to the present invention.

Referring now to FIG. 3 and FIG. 4, the operation of the embodiment of the eight speed transmission 100 will be described. It will be appreciated that transmission 100 is capable of transmitting torque from the input shaft or member 112 to the output shaft or member 122 in at least eight forward speed or torque ratios and at least one reverse speed or torque ratio. Each forward and reverse speed or torque ratio is attained by engagement of three of the torque-transmitting mechanisms (i.e. first brake 124, second brake 126, first clutch 128, second clutch 130, third clutch 132), as will be explained below. FIG. 4 is a truth table presenting the various combinations of torque-transmitting mechanisms that are activated or engaged to achieve the various gear states. An "X" in the box means that the particular clutch or brake is engaged to achieve the desired gear state. Actual numerical gear ratios of the various gear states are also presented although it should be appreciated that these numerical values are exemplary only and that they may be adjusted over significant ranges to accommodate various applications and operational criteria of the transmission 100.

To establish a reverse gear, the first brake 124, the second brake 126, and the third clutch 130 are engaged or activated. The first brake 124 connects the second interconnecting shaft or member 142 with the stationary member or transmission housing 150 in order to restrict the ring gear member 114C from rotating relative to the stationary member or transmission housing 150. The second brake 126 connects the first interconnecting shaft or member 140 with the stationary member or transmission housing 150 in order to restrict the sun gear member 114A from rotating relative to the stationary member or transmission housing 150. The third clutch 130 connects the fourth interconnecting shaft or member 146 with the seventh interconnecting shaft or member 154. Likewise, the eight forward ratios are achieved through different combinations of clutch and brake engagement, as shown in FIG. 4.

Referring now back to FIG. 1, the transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data.

The transmission control module 26 controls the actuation of the plurality of torque transmitting mechanisms via a hydraulic control system 28 according to the principles of the present disclosure. The control logic may be implemented in hardware, software, or a combination of hardware and software. For example, control logic may be in the form of program code that is stored on the electronic memory storage and executable by the processor. The transmission controller 26 receives the output signals of several sensors throughout the transmission and engine, performs the control logic and sends command signals to the hydraulic control system 28. The hydraulic control system 28 receives command signals from the transmission controller 26 and converts the command signals to hydraulic signals to control the actuation of the brakes and clutches 124, 126, 128, 130, 132.

Figure 6:
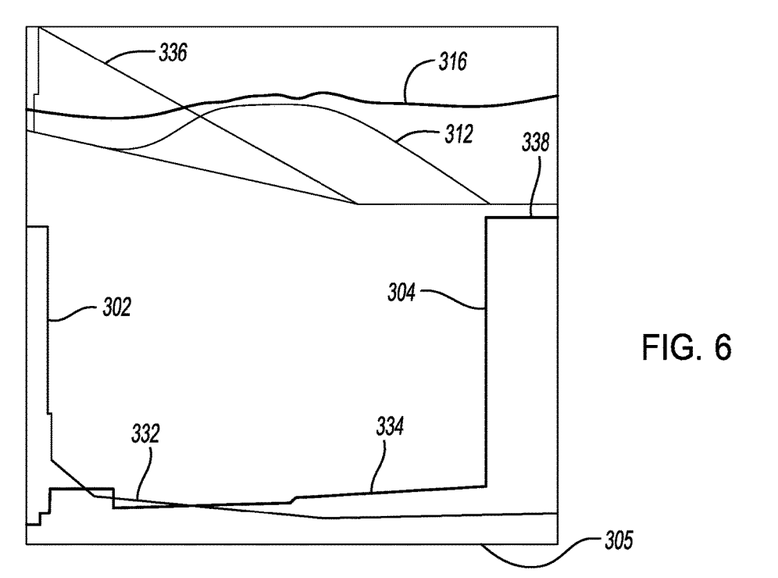
FIG. 6 is an illustration of various powertrain parameters as the method of FIG. 5 is performed.
Figure 7:
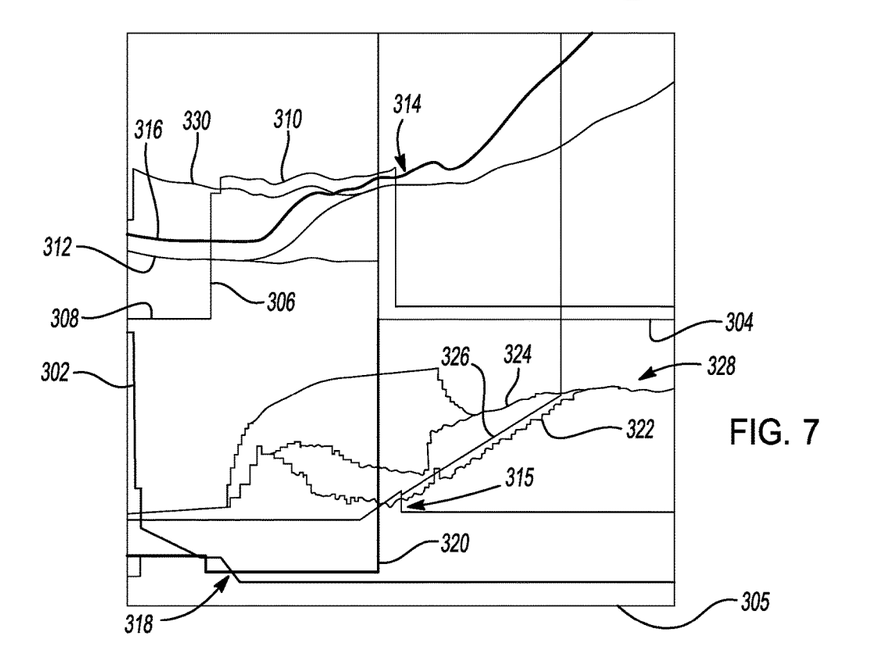
FIG. 7 is an illustration of various powertrain parameters as the method of FIG. 5 is performed.

For example, a control logic implemented in software program code that is executable by the processor of the transmission controller 26 includes a first control logic for detecting a sub-idle coast downshift. The execution of the control logic can also be followed in FIGS. 6 and 7 which depict the various parameters of the engine and transmission as the control logic executes. The sub-idle coast downshift is a shift from a higher gear, for example $3^{rd}$ gear, to the next lower gear, in this case $2^{nd}$ gear, as the vehicle is coasting without any driver torque demand or throttle pedal actuation. A second control logic detects if the shift from $3^{rd}$ gear to $2^{nd}$ gear is complete if the first control logic detects that there is a sub-idle coast downshift occurring. As is noted from review of the clutch table of FIG. 4, the two steps required by the hydraulic control system 28 for changing gear ratios from $3^{rd}$ to $2^{nd}$ gear ratio is first, the first clutch 128 must be deactivated, and second, the second brake 126 must be activated. FIGS. 6 and 7 show the offgoing clutch or brake pressure 302 and the oncoming clutch or brake pressure 304 over time 305. Thus if these two steps have not completed then the downshift has not completed. A third control logic detects if there has been a driver step-in 306 if the second control logic detected that the downshift has not completed. FIG. 7 depicts the control logic operating parameters if driver step-in 306 has been detected. The driver step-in 306 includes the driver depressing the throttle pedal 308 creating an engine speed request 310. A fourth control logic detects if the turbine 312 of the torque convertor is in sync with the engine speed 312 or if turbine pull-down 314 has occurred. Turbine pull-down 314 occurs when the oncoming clutch 304 is activated such as to place a load on the turbine and slow the turbine down. If turbine pull-down 314 has occurred, a fifth control logic determines and provides a transmission load 315 to the engine to increase engine speed 316. The transmission load is a calibrated rate beginning at zero and targeting a calculated target load. The target transmission load is set using the following calculation:

$$\tau_{Trans\_Load\_Target} = \frac{(\tau_{Clutch\_Target} / TorqueRatio)}{Lever\_Ratio} + Ofst$$

However, if turbine pull-down 314 has not occurred, a sixth control logic freezes the transmission load and therefore maintains current engine speed 316. A seventh control logic executes, after the driver step-in 306 has been detected in the third control logic, ramping out the offgoing clutch or brake 318. In this case, the second brake 126 pressure ramps down. An oncoming clutch torque target is calculated and the oncoming clutch pressure 320 is ramped up to meet the target oncoming clutch torque:

$$P_{oncoming\ clutch\ target} = G_{\chi oncoming\ clutch} * (\tau_{oncoming\ clutch\ target}) + P_{RS}$$

Where $G_{\chi oncoming\ clutch}$ is the clutch gain for the oncoming clutch, $\tau_{oncoming\ clutch\ target}$ is the oncoming clutch torque target calculated by:

$$\tau_{oncoming\ clutch\ target} = Lever\ Ratio * \tau_{driver\ demand},$$

and $P_{RS}$ is the Return Spring pressure for the oncoming clutch. If the turbine acceleration towards the target ratio speed 330 is above the threshold set by calibration, then the oncoming pressure is frozen.

Turning now to FIG. 6, the control logic is depicted in the event that a downshift is occurring without the driver step-in event 306. An eighth control logic is executed if the driver step-in 306 is not detected in the third control logic. The eighth control logic calculates the offgoing brake 126 pressure 332 and calculates the oncoming clutch ramp rate 334 as a function of the target gear slip error. As executed by the seventh control logic, if the turbine 312 acceleration towards the target ratio speed 336 is above the threshold set by calibration, then the oncoming pressure is frozen 338. After the fifth, seventh, and eighth control logic executes, the controller returns to execute the second control logic again.

If in the second control logic the controller detects that the shift is complete, then a ninth control logic is executed. The ninth control logic detects if the engine torque 322 at the end of the shift is less than the engine torque at steady state 324. If the engine torque 322 is less than the steady state engine torque 324, then the controller issues a torque management request 326 to ramp engine torque 322 to steady state level 324 in a controlled fashion as accomplished in a tenth control logic. If the torque management request 326 is issued, the controller executes the ninth control logic again. If the engine torque 322 is equal to the steady state torque 324, then the downshift control ends 328.

Figure 5:
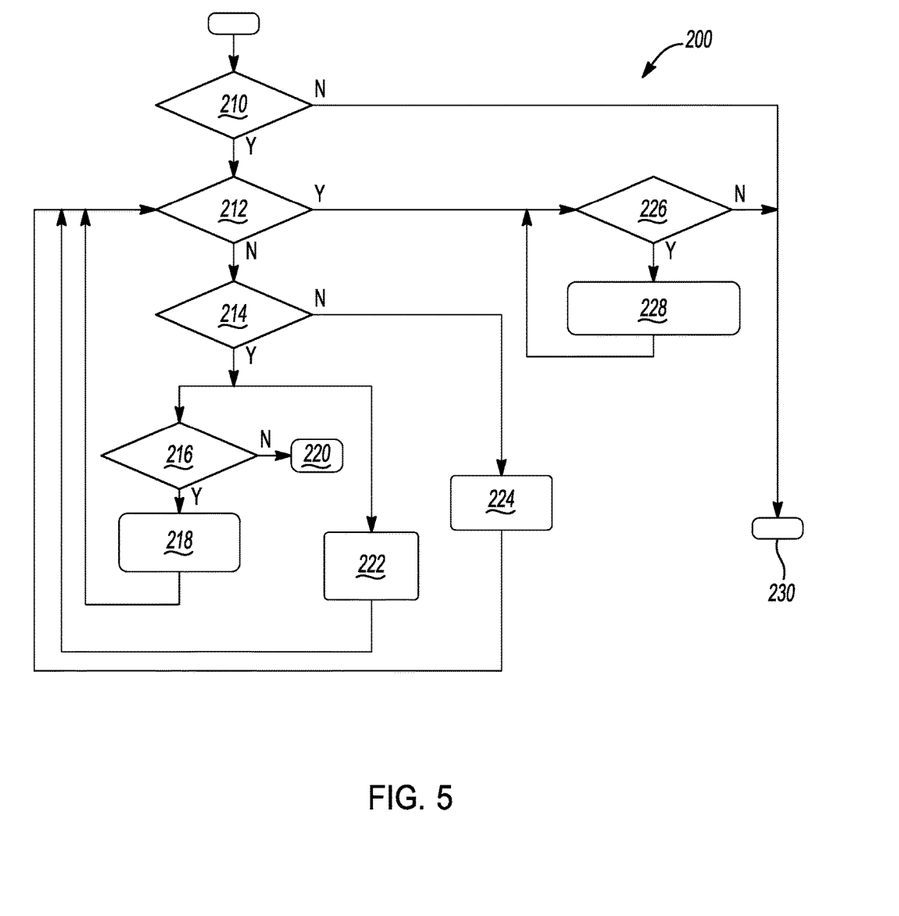
FIG. 5 is a flow chart depicting a method of operating a ten speed transmission according to the present invention.

Referring now to FIG. 5, a flow chart depicting a method 200 for operating an embodiment of the transmission 100 is illustrated. However, the method 200 can be adapted to other transmission arrangements without departing from the scope of the invention. The method 200 begins with a vehicle coasting at speed with the driver's foot not depressing the throttle pedal. A first step 210 of the method 200 detects a sub-idle coast downshift. If the first step 210 of the method 200 detects that there is a sub-idle coast downshift occurring, a second step 212 of the method 200 detects if the shift from a high gear ratio to the next lower gear is complete. Again, for the transmission depicted a sequential gear change is achieved by deactivation of the offgoing clutch and activation of the oncoming clutch. Thus, if the offgoing clutch has not deactivated and the oncoming clutch has not activated then the downshift has not completed. If the downshift has not been completed, a third step 214 of the method 200, detects if there has been a driver step-in of the throttle pedal. If a driver step-in has been detected, a fourth step 216 of the method 200 detects if the turbine of the torque convertor is in sync with engine speed or if turbine pull-down has occurred. If turbine pull-down has occurred, a fifth step 218 of the method 200 determines a transmission load and makes an engine speed request to match the transmission load. However, if turbine pull-down has not occurred, a sixth step 220 of the method 200 freezes the transmission load and therefore maintains current engine speed. A seventh step 222 of the method 200 also executes after the driver step-in has been detected in the third step 214 of the method 200. The seventh step 222 includes ramping out the pressure of the offgoing clutch or brake. Additionally, an oncoming target clutch torque is calculated and the oncoming pressure is ramped to meet the target oncoming clutch torque as described above. If the turbine acceleration towards the target ratio speed is above the threshold set by calibration, then the oncoming pressure is frozen.

An eighth step 224 of the method 200 is executed if the driver step-in is not detected in the third step 214 of the method. The eighth step 224 calculates the offgoing brake pressure and calculates the oncoming clutch ramp rate as a function of the target gear slip error. As executed by the seventh step 222, if the turbine acceleration towards the target ratio speed is above the threshold set by calibration, then the oncoming pressure is frozen. After the fifth, seventh, and eighth steps 218, 222, 224 execute, the controller returns to execute the second step 212 of the method 200.

If in the second step 212 of the method 200 the controller detects that the shift is complete, then a ninth step 226 is executed. The ninth step 226 of the method 200 detects if the engine torque at the end of the shift is less than the engine torque at steady state. If the engine torque is less than the steady state engine torque, then a tenth step 228 is executed in which the controller issues a torque management request to ramp engine torque to steady state level in a controlled fashion. If the torque management request is issued, the controller executes the ninth step 226 again. If the engine torque is equal to the steady state torque, then the downshift control ends.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission for a vehicle, the transmission including:
   an input member;
   an output member;
   a plurality of planetary gear sets each having a first, second, and third members, and wherein the input member is connected to one of the members of one of the planetary gear sets and the output member is connected to another one of the members of one of the planetary gear sets;
   a plurality of interconnecting members each connecting for common rotation one of the first, second, or third members of one of the planetary gear sets with another of the first, second, or third members of another planetary gear set;
   a plurality of torque transmitting mechanisms each selectively connecting one of the first, second, or third members of one of the planetary gear sets with another of the first, second, or third members of a planetary gear set or a stationary member; and
   a transmission control module having a control logic sequence, wherein the control module operates to control engagement of each of the plurality of torque transmitting mechanisms; and
   wherein the torque transmitting mechanisms are selectively engageable in combination to establish a plurality of forward speed gear ratios and a reverse speed ratio between the input member and the output member and changing from one gear ratio to another sequential gear ratio requires disengaging an off going torque transmitting mechanism and engaging an oncoming torque transmitting mechanism,
   wherein the control logic sequence includes:
   a first control logic for detecting a sub-idle coast downshift from a higher gear ratio to a lower, sequential gear ratio;
   a second control logic for detecting when the sub-idle coast downshift is complete when the first control logic detects that the sub-idle coast downshift is occurring;
   a third control logic for detecting when there has been a driver step-in when the second control logic detected that the downshift has not completed;
   a fourth control logic for detecting when a turbine of a torque convertor connected to the input member of the transmission is in sync with a rotational speed of an engine drivingly connected to a pump of the torque;
   a fifth control logic for calculating a transmission load and sending a speed increase request to the engine based on the transmission load to increase engine speed when the turbine is not in sync with the engine speed;
   a sixth control logic for maintaining engine speed when the turbine is in sync with the engine speed;
   a seventh control logic for ramping out the off going torque transmitting mechanism after the driver step-in has been detected in the third control logic and for ramping up the oncoming torque transmitting mechanism;
   an eighth control logic for calculating an off going brake pressure and an oncoming clutch ramp rate when the driver step-in is not detected in the third control logic; and
   a ninth control logic for ramping up a torque of the engine when the torque of the engine at the completion of the downshift is less than a steady state.

2. The transmission of claim 1 wherein after the execution of the fifth, seventh, and eighth control logics the controller returns to execute the second control logic.

3. The transmission of claim 2 wherein the controller executes the ninth control logic again when the controller detects that the torque of the engine at the end of the downshift is less than a steady state torque.

4. The transmission of claim 3 wherein the oncoming clutch target pressure of the seventh control logic is calculated as $$P_{oncoming\ clutch\ target} = G_{\chi oncoming\ clutch} * (\tau_{oncoming\ clutch\ target}) + P_{RS}$$

wherein $G_{102\ oncoming\ clutch}$ is the clutch gain for the oncoming clutch, $\tau_{oncoming\ clutch\ target}$ is the oncoming clutch torque target and $P_{RS}$ is the return spring pressure for the oncoming clutch.

5. The transmission of claim 4 wherein a first and a second of the plurality of torque transmitting mechanisms are each selectively engageable to connect a member of a first of the plurality of planetary gear sets with the stationary member and a second, a third, and a fourth of the plurality of torque transmitting mechanisms are each selectively engageable to connect a member of a second, and a third of the plurality of planetary gear sets with a first member of a fourth of the plurality of planetary gear sets.

6. A transmission for a vehicle, the transmission including:
   an input member;
   an output member;
   a first, second, third, and fourth planetary gear sets each having a first, second, and third members, and wherein the input member is connected to one of the members of the second planetary gear set and the output member is connected to one of the members of the fourth the planetary gear set;

four interconnecting members each connecting for common rotation one of the first, second, or third members of one of the planetary gear sets with another of the first, second, or third members of another planetary gear set;

five torque transmitting mechanisms each selectively connecting one of the first, second, or third members of one of the planetary gear sets with another of the first, second, or third members of a planetary gear set or a stationary member; and a transmission control module having a control logic sequence, wherein the control module operates to control engagement of each of the plurality of torque transmitting mechanisms;

wherein the torque transmitting mechanisms are selectively engageable in combinations of three to establish a plurality of forward speed gear ratios and a reverse speed ratio between the input member and the output member and changing from one gear ratio to another sequential gear ratio requires disengaging an off going torque transmitting mechanism of the five torque transmitting mechanisms and engaging an oncoming torque transmitting mechanism of the five torque transmitting mechanisms, and wherein the control logic sequence includes:

a first control logic for detecting a sub-idle coast downshift from a higher gear ratio to a lower, sequential gear ratio;

a second control logic for detecting when the sub-idle coast downshift is complete when the first control logic detects that the sub-idle coast downshift is occurring; and a third control logic for ramping up a torque of the engine when the torque of the engine at the completion of the downshift is less than a steady state.

7. The transmission of claim 6 wherein the control logic sequence further includes:

a fourth control logic for detecting when there has been a driver step-in when the second control logic detected that the downshift has not completed;

a fifth control logic for detecting when a turbine of a torque convertor connected to the input member of the transmission is in sync with a rotational speed of an engine drivingly connected to a pump of the torque;

a sixth control logic for calculating a transmission load and sending a speed increase request to the engine based on the transmission load to increase engine speed when the turbine is not in sync with the engine speed;

an seventh control logic for maintaining engine speed when the turbine is in sync with the engine speed;

an eighth control logic for ramping out the off going torque transmitting mechanism after the driver step-in has been detected in the third control logic and for ramping up the oncoming torque transmitting mechanism;

a ninth control logic for calculating an off going brake pressure and an oncoming clutch ramp rate when the driver step-in is not detected in the third control logic.

8. The transmission of claim 7 wherein after the execution of the sixth, eighth, and ninth control logics the controller returns to execute the second control logic.

9. The transmission of claim 8 wherein the controller executes the third control logic again when the controller detects that the torque of the engine at the end of the downshift is less than a steady state torque.

10. The transmission of claim 7 wherein the oncoming clutch target pressure of the seventh control logic is calculated as $$P_{oncoming\ clutch\ target} = G_{\chi oncoming\ clutch} * (\tau_{oncoming\ clutch\ target}) + P_{RS}$$

wherein $G_{\chi oncoming\ clutch}$ is the clutch gain for the oncoming clutch, $\tau_{oncoming\ clutch\ target}$ is the oncoming clutch torque target and $P_{RS}$ is the return spring pressure for the oncoming clutch.

11. The transmission of claim 10 wherein a first and a second of the plurality of torque transmitting mechanisms are each selectively engageable to connect a member of a first of the plurality of planetary gear sets with a stationary member and a second, a third, and a fourth of the plurality of torque transmitting mechanisms are each selectively engageable to connect a member of a second, and a third of the plurality of planetary gear sets with a first member of a fourth of the plurality of planetary gear sets.

12. A method for controlling an eight speed planetary gear set transmission, the method comprising:

detecting a sub-idle coast downshift from a higher gear ratio to a lower, sequential gear ratio;

detecting when the sub-idle coast downshift is complete when the first step of the method detects that the sub-idle coast downshift is occurring;

detecting when there has been a driver step-in when the second step of the method detected that the downshift has not completed;

detecting when a turbine of a torque convertor connected to an input member of the transmission is in sync with a rotational speed of an engine drivingly connected to a pump of the torque converter;

calculating a transmission load and sending a speed increase request to the engine based on the transmission load to increase engine speed when the turbine is not in sync with the engine speed;

maintaining engine speed when the turbine is in sync with the engine speed;

ramping out an off going torque transmitting mechanism after the driver step-in has been detected and for ramping up an oncoming torque transmitting mechanism;

calculating an off going brake pressure and an oncoming clutch ramp rate when the driver step-in is not detected; and ramping up a torque of the engine when the torque of the engine at the completion of the downshift is less than a steady state.

13. The method for controlling the eight speed planetary gear set transmission of claim 12 further comprising stopping ramping the torque of the engine when the torque of the engine at the completion of the downshift is greater than a steady state.

14. The method for controlling the eight speed planetary gear set transmission of claim 12 wherein the oncoming clutch target pressure of the seventh control logic is calculated as $P_{oncoming\ clutch\ target} = G_{\chi oncoming\ clutch} * (\tau_{oncoming\ clutch\ target}) + P_{RS}$ wherein $G_{\chi oncoming\ clutch}$ is the clutch gain for the oncoming clutch, $\tau_{oncoming\ clutch\ target}$ is the oncoming clutch torque target and $P_{RS}$ is the return spring pressure for the oncoming clutch.

* * * * *